United States Patent [19]
Miki

[11] Patent Number: 5,162,279
[45] Date of Patent: Nov. 10, 1992

[54] IMMOBILIZED METAL COMPLEXES

[75] Inventor: Keiji Miki, Tsukuba, Japan

[73] Assignee: Director-General of Agency of Industrial Science and Technology, Japan

[21] Appl. No.: 726,784

[22] Filed: Jul. 8, 1991

[30] Foreign Application Priority Data

Jul. 10, 1990 [JP] Japan .................................. 2-182179

[51] Int. Cl.[5] .............................................. B01J 31/22
[52] U.S. Cl. .................................... 502/158; 502/150; 502/162; 502/163; 502/166; 502/167; 502/168; 502/170; 502/164
[58] Field of Search ............... 502/158, 150, 162, 164, 502/166, 167, 168, 170, 163

[56] References Cited

U.S. PATENT DOCUMENTS

| | | | |
|---|---|---|---|
| 3,726,809 | 4/1973 | Allum et al. | 502/158 |
| 3,980,583 | 9/1976 | Mitchell et al. | 502/158 |
| 4,083,803 | 4/1978 | Oswald et al. | 502/158 |
| 4,220,556 | 9/1980 | Oswald et al. | 502/158 |
| 4,257,916 | 3/1981 | Hancock et al. | 502/158 |

*Primary Examiner*—Patrick P. Garvin
*Attorney, Agent, or Firm*—Lorusso & Loud

[57] ABSTRACT

An immobilized metal complex is disclosed, which is immobilized on an inorganic carrier to which a long molecular chain compound capable of surrounding the metal complex is bound in an amount of at least 1.5 mols per mol of the metal complex. This novel immobilized metal complex has an excellent stability and can be used as a metal complex catalyst providing excellent reactivity.

15 Claims, No Drawings

IMMOBILIZED METAL COMPLEXES

BACKGROUND OF THE INVENTION

This invention relates to a novel immobilized metal complex.

Various metal complex catalysts to be used in a homogeneous system by dissolving in a solvent have conventionally been known. However, such catalysts involve the problems of inferior stability and difficulty in separating and recovering from the reaction system. In order to solve these problems, it has so far been widely conducted to immobilize the metal complex catalysts. In this case, carriers such as inorganic carriers (e.g., silica, alumina, zeolite, etc.) and organic high molecular carriers have been used for supporting the metal complexes. Catalysts wherein the metal complexes are merely bound to the carriers, however, have the problems that there is a limit as to stability of the complexes due to the structure of the catalysts and that they provide still insufficient reaction activity and reaction selectivity.

SUMMARY OF THE INVENTION

It is an object of the present invention to provide an immobilized metal complex which can solve the above-described problems of the conventional immobilized metal complexes and which is useful as a metal complex catalyst providing excellent reaction activity and excellent reaction selectivity.

This object can be solved by surrounding the immobilized metal complex by a long molecular chain compound. That is, in accordance with the present invention, there is provided an immobilized metal complex wherein the metal complex is surrounded by a long molecular chain compound bound to the carrier in an amount of at least 1.5 mols per mol of the metal complex.

Other objects, features and advantages of the present invention will become apparent from the detailed description of the preferred embodiments of the invention to follow.

DETAILED DESCRIPTION OF THE PREFERRED EMBODIMENTS OF THE INVENTION

Carriers to be used for immobilizing the metal complexes of the present invention are inorganic carriers. As such carriers, those which originally have reactive groups on the surface thereof or those which have pre-introduced reactive groups may be used. Such reactive groups include a hydroxyl group, a carboxyl group, a halogen atom, an amino group, a sulfonic acid group, etc. Inorganic oxides such as silica, alumina and titania originally have hydroxyl groups on the surface thereof and, thus, are suitable as the inorganic carriers to be used in the present invention.

Other reactive groups than the aforesaid hydroxyl group may be introduced by utilizing the reactivity of the hydroxyl group or by binding an organic compound having the aforementioned reactive group to the surface of the carrier. In addition, metal halides (e.g., titanium halide) may also be used as carriers in the present invention.

The immobilized metal complexes of the present invention may be produced in various manners, but are preferably produced by a method including the steps of binding a short molecular chain compound having a metal ion-capturing group or groups onto the surface of the aforementioned inorganic carrier, binding a long molecular chain compound onto the surface of the carrier, allowing the metal ion-capturing group to capture a metal ion, and then reacting the metal ion with a ligand for forming a desired complex. All of these reactions are conducted in an organic solvent or an aqueous solvent.

The short molecular chain compound having the metal ion-capturing group or groups (hereinafter also referred to as "short molecular chain compound") is used for immobilizing a metal complex on the surface of a carrier and has a reactive group capable of being bound to the surface of the carrier as well as the metal ion-capturing group. This reactive group is a group capable of reacting with the aforesaid reactive group on the surface of the carrier and includes, for example, a halogen atom, a hydroxyl group, a carboxyl group, a sulfonic acid group, a dichloropyrimidine residue, a dichlorotriazine residue, a dichloroquinoxaline residue, a group containing a sulfato-ethylsulfonyl group ($-SO_2-CH_2-CH_2\ OSO_3H$), a difluoromonochloropyrimidine residue, a residue containing an acrylamide group ($-NHCO-CH=CH_2$), a residue containing trialkoxy(or trihalogeno)silane (silane coupling agent), etc. Proper ones may be selected from among these reactive groups depending upon the state of the carrier surface or the kind of the reactive groups existing on the carrier surface. As the aforementioned metal ion-capturing groups, there may be illustrated various conventionally known ones such as a carboxyl group, a thiocarboxyl group an amino group, an azo group (heterocyclic group), a cyano group, a hydrophosphorous acid group, a phosphorous acid group, an imine group, an alkylphosphine group, an arylphosphine group, a selenol group ($-SeH$), etc. The short molecular chain compounds contain 1-10 atoms, preferably 2 to 8 atoms in the intermediate molecular chain excepting the metal ion-capturing group and the reactive group. The atoms constituting the intermediate molecular chain are, for example, carbon, nitrogen, oxygen, sulfur, silicon, etc.

As the aforesaid short molecular chain compounds, there are illustrated, for example, organic silicon compounds (silane coupling agents) represented by the following general formula:

$$RSi(X_n)(Y_m) \tag{I}$$

(wherein R represents a residue containing a metal ion-capturing group, X represents a halogen atom or a lower alkoxy group, Y represents an alkyl group, n represents an integer of 1 to 3 and m represents an integer of 0-2 with the proviso that $m+n$ is 3).

Specific examples of the compounds of the formula (I) are illustrated below:

$Cl_3Si(CH_2)_m-COOH$, $Cl_3Si(CH_2)_mSH$,
$(CH_3)(CH_3O)_2Si(CH_2)_3SH$, $(CH_3O)_3Si(CH_2)_m COOH$, $(CH_3O)_3Si(CH_2)_mNH_2$, $(CH_3O)_3Si(CH_2)_mN(CH_3)_2$, $(CH_3O)_3Si(CH_2)_mNH(CH_2)_mNH_2$,

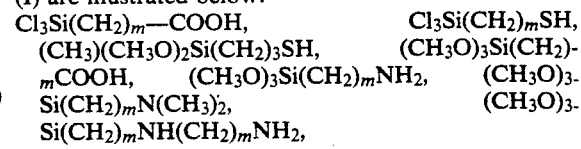

$Cl_3Si(CH_2)_mPPh_2$, $(CH_3O)_3Si(CH_2)_mPPh_2$,

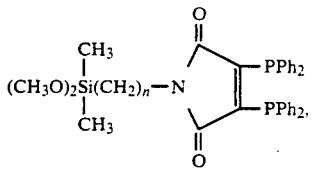

$(CH_3O)_3Si(CH_2)_mC_6H_4PPh_2$, $(CH_3O)_3Si(CH_2)_mP(C_2H_5)_2$, $(CH_3O)_3SiCp$, $(CH_3O)_3Si(CH_2)_mCp$, $(CH_3O)_3SiPPh_3$, $(CH_3O)_3Si(CH_2)_mN(CH_3)_3^+\cdot Cl^-$, $(CH_3O)_3Si(CH_2)_mNH_3^+\cdot Cl^-$, $(CH_3O)_3Si(CH_2)_mCN$, etc., in which Cp represents cyclopentadienyl group, Ph represents a phenyl group, and m represents an integer of 1 to 8.

In addition to the above-described organosilicon compounds, alkyl halides, fatty acid halides, alkyl alcohols, and the like which have a metal ion-capturing group or groups are also usable as the short molecular chain compounds.

In the case of reacting the short molecular chain compound with reactive groups on the surface of the solid carrier, the metal ion-capturing group is preferably protected by a protective group prior to the reaction. As such protective group, those which have conventionally been known may be used. For example, ester-forming alcohol groups may be used for protecting such metal ion-capturing groups as acid groups (e.g. carboxy group, sulfonic acid group, etc.). If desired, acyl groups or alkoxy groups may be used for protecting amino groups. After the reaction, these protective groups are eliminated by, for example, hydrolysis, and the resulting unprotected reactive groups are in turn reacted with the metal ion.

The long molecular chain compound is used for surrounding the metal complex formed on the surface of the carrier to stabilize the complex and to form a reaction site where the metal complex interacts with a reaction substrate. With solid catalysts such as alumina, silica and zeolite, fine pores therein are utilized as reaction sites. In the present invention, cavity formed on the surface of the carrier by the long molecular chain compound surrounding the metal complex is utilized as the reaction site. This long chain molecular compound must be long enough to surround the metal complex on the surface of the carrier and provide cavity for enclosing a reaction substrate on which the metal complex acts. In general, those wherein a molecular chain excluding the reactive group has 8 or more atoms, preferably 10 to 30 atoms, are preferred. The atoms constituting the molecular chain include carbon, oxygen, sulfur, nitrogen, silicon, etc. Those mainly constituted by a long chain hydrocarbons are preferred.

The long molecular chain compound has a reactive group for binding it onto the surface of carrier. As the reactive group, there are illustrated those which have been referred to with respect to the aforesaid short molecular chain compounds. The long molecular chain compounds are exemplified by organosilicon compounds represented by the following general formula:

$$LSi-X_n \qquad (II)$$

(wherein L represents a long molecular chain such as alkyl, alkenyl, polyether or polythioether, X represents a halogen atom or an alkoxy group, and n represents an integer of 1 to 3).

In addition to the above-described compounds, the long molecular chain compound includes a halogenated paraffin having a terminal halogen atom, a higher fatty acid halide, a halogenated hydrocarbon having an aromatic or alicyclic ring, a compound having a steroid skeleton, etc. Binding the long molecular chain compound to a carrier may be conducted by directly binding it to the reactive group on the surface of carrier or by reacting it with the metal ion-capturing group of the aforementioned short molecular chain compound.

As the metal ion to be bound to the metal ion-capturing group of the short molecular chain compound, various transition metal ions are used. Such metal ions have so far been well known and are exemplified by Cr, Mn, Fe, Co, Ni, Cu, Mo, Ru, Rh, Pd, Ag, Au, W, Os, Pt, Zn, Ti, etc. In addition, metal ions such as Mg, Al, Pd, etc. are also usable. In reacting the metal ion with the metal ion-capturing group, the metal ion may be used in the form of, for example, a metal halide, metal salt or metal complex.

As ligands for forming the metal complexes, various conventionally known ones used for forming metal complexes may be used. Such ligands are exemplified by $NO_3^-$, CO, $CH_3CO$, picoline, $F^-$, $SO_4^-$, $OH^-$, $Cl^-$, $C_6H_5COO^-$, $NH_3$, piperidine, aniline, pyridine, bipyridine, $NO_2^-$, $(C_6H_5CH_2)_2S$, imidazole, phthalimide, $C_6H_5O-$, $C_6H_5N(CH_3)_2$, $NH_2OH$, $NH_2NH_2$, $C_6H_5SH$, $Br^-$, $(C_2H_5)_3N$, $(C_2H_5)_2NH$, $(C_2H_5)_2S$, $\{(C_2H_5)_2N\}_3P$, $(CH_3O)_2PO-$, $SnCl_4-$, $I^-$, $C_6H_5CH_2Se$, $C_6H_{11}NC$, $SeCN^-$, $CN^-$, $SC(NH_2)_2$, $SCN^-$, $(CH_3O)_3P$, $(C_6H_5)_3P$, $(C_4H_9)_3P$, $(C_2H_5O)_3P$, $C_6H_5O)_3P$, $C_6H_5S^-$, $S_2O_3^{2-}$, $CF_3COO^-$, $NCS^-$, $NCO^-$, etc. Metal complexes are formed by supplying lone-pair electrons of the ligands to a central metal and, generally, those compounds which have such atoms as oxygen, nitrogen, sulfur, phosphorus, etc. and $\pi$ electrons can be used as ligands. Bidentate ligans, tridentate ligands, tetradentate ligands, pentadentate ligands and hexadentate ligands may also be used as well as monodentate ligands.

In case where the metal ion bound to the metal-capturing group of the short molecular chain compound has a metal complex structure, it is not necessary to further react the metal ion with a ligand.

The ratio of the short molecular chain compound (plus metal complex) to the long molecular chain compound must be selected so that the short molecular chain compound (plus metal complex) may be surrounded by the long molecular chain compound and, as a general guide, 1.5 mols or more, preferably 2 to 3 mols, of the long molecular chain compound be used per mol of the short molecular chain compound (plus metal complex). The largest total mol number of the compounds to be bound to the surface of carrier changes depending upon the surface state of carrier. For example, micropore-free silica fine particles of 12 nm in average particle size can accept, at the most, 0.5 mol of the compounds per mol of silanol group existing on the surface of carrier. With such silica carriers, an intended immobilized metal complex can be obtained by reacting the short molecular chain compound with up to 18 % of silanol group based on the total silanol group existing on the surface of carrier, and reacting the long molecular chain compound with the rest of silanol group.

The metal complex of the present invention immobilized on an inorganic carrier is stabilized by being surrounded by the long molecular chain compound and, upon use, prevents the metal ion or metal complex from being eliminated. Even unstable metal complexes such as cobalt-pyridine complex do not suffer elimination from the carrier owing to the structure of the present invention, and can be stably used in water. In the cobalt complex of the present invention, the cavity surrounded by the long molecular chain compound provides a reaction site, whereinto reaction substrates diffuse and wherein the reaction substrates come into contact with the metal complex to undergo catalytic reaction. Properties or shape of the reaction site can be controlled by changing properties of the long molecular chain compound (for example, by properly selecting the terminal group from among a phenyl group, an acidic group, a basic group, etc.), by changing atoms constituting the long molecular chain compound or by binding a proper side chain to the long molecular chain compound.

The metal complexes of the present invention can advantageously be used as catalysts for various reactions by properly selecting kinds of metal and ligand. The relation between the kind of metal complex and reaction has conventionally been well known and is described in, for example, Takeshi Onoda; "Industrial Reaction Using Metal Complexes" [Lecture on Catalysts, vol.4, chap.2, par.4 (1986)]. Such reactions include, for example, oxidation reaction, hydrogenation reaction, isomerization reaction, hydroformylation reaction, hydrosilylation reaction and origomerization reaction. More particularly, the reactions include oxidation reaction of a mercapto compound using a cobalt-phthalocyanine complex, hydrogenation reaction of unsaturated bonds using a titanocene complex, intramolecular cyclization reaction using a palladium/phosphine complex, hydroformylation reaction using a rhodium/phosphine complex, hydrosilylation reaction using a palladium/phosphine complex, origomerization reaction using a nickel/phosphine complex, hydrogenation reaction using a rhodium (or Ir, Ru, Os or Co)/phosphine complex, epoxydation reaction of olefin using an iron/phosphine complex and hydrogenation reaction using a titanium/cyclopendadiene complex.

The metal complexes of the present invention may also be used as agents for treating an oily substance dispersed or dissolved in water, agents for treating waste water or agents for removing pollutants, in addition to catalysts, by properly selecting kinds of the metal complexes.

The present invention is now described in more detail by reference to the following Examples and Comparative Examples.

EXAMPLE 1

Silica fine particles (AEROSIL 200) were dispersed in toluene, and 3.5 wt %, based on the silica fine particles, of 2-(methoxycarbonyl)ethyltrichlorosilane ($CH_3OCOC_2H_5SiCl_3$) was added thereto as a short-chain compound, followed by leaving the mixture for 12 hours at 120° C. in a stream of argon. After allowing to cool, the reaction mixture was filtered, and the reaction product was washed with successive, toluene and chloroform, then dried. The thus washed product was again dispersed in toluene, and 20-25 wt %, based on the silica fine particles, of n-octadecyltrichlorosilane was added thereto as a long molecular chain compound, followed by refluxing the mixture at 120° C. for 12 hours in a stream of argon to react. Thereafter, 10 wt % of n-octadecyltrichlorosilane was further added thereto, followed by conducting the reaction in the same manner for 12 hours. After completion of the reaction, the reaction mixture was allowed to cool, filtered off, and washed.

The reaction product was dispersed in dimethylsulfoxide, 1 wt % of potassium butoxide was added thereto, and the mixture was treated for 30 minutes in an ultrasonic bath to thereby eliminate the methyl group of the short molecular chain compound to convert the ester group to —COOK group. The reaction product was then filtered off, washed with water and dried. The thus-obtained product was dispersed in an aqueous solution of cobalt (II) acetate, treated for 1 hour in an ultrasonic bath, filtered off, washed with water and dried. After colorimetric determination of introduced cobalt, the product was dispersed in a 50 % ethyl alcohol, and 6 mols of pyridine was added thereto as ligand per mol of cobalt. The mixture was subjected to ultrasonic treatment for 1 hour, and the reaction product was filtered off, washed with water and dried.

The thus-obtained metal complex (1.5 mM) was dispersed as a catalyst in water. Tetralin (15 mM) was dispersed therein as a reaction substrate, and the mixture was shaken in an atmosphere of oxygen at 1 atmospheric pressure to produce tetralol and tetralone. After 24 hours, concentration of tetralin was decreased to 30 % or less based on the initial concentration.

EXAMPLE 2

Silica fine particles were dispersed in toluene, and 4.5 wt %, based on the silica fine particles, of N-[3-(methoxysilyl)-propyl]imidazole was added thereto as a short molecular chain compound, followed by conducting the reaction for 24 hours under reflux in a stream of argon. After completion of the reaction, the reaction product was collected by filtration, washed with successive, toluene and chloroform, then dried. The thus washed product was again dispersed in toluene, and 20-25 wt %, based on the silica fine particles, of n-octadecyltriethoxysilane was added thereto as a long molecular chain compound, followed by conducting the reaction at 120° C. in a stream of argon till a methylene absorption intensity measured by infrared spectrophotometry became constant. After completion of the reaction, the reaction product was collected by filtration, washed, and dried.

Thereafter, the reaction product was dispersed in an aqueous solution of cobalt (II) acetate, treated for 1 hour in an ultrasonic bath, filtered off, washed with water and dried. After colorimetric determination of introduced Co (II) ion, the product was dispersed in a 50 % ethyl alcohol, and 5 mols of pyridine was added thereto as ligand per mol of cobalt ion immobilized by carboxy group. The mixture was subjected to ultrasonic treatment for 1 hour, and the reaction product was collected by filtration, washed with water and dried.

The thus-obtained metal complex (1.5 mM) was dispersed as a catalyst in water. 200 mM of tetralin was added thereto. 50 of the substrate was converted to tetralol, tetralone and a small amount of 1,4-dihydroxytetralin by merely shaking the mixture for 24 hours in an atmosphere of oxygen at atmospheric pressure. The turn-over number was 74.

COMPARATIVE EXAMPLE 1

Experiments were conducted in the same manner as in Example 1 except for omitting the long molecular chain compound of n-octadecyltrichlorosilane, and oxidation of tetralin was conducted in the same manner as in Example 1 using the thus-obtained metal complex product as a catalyst. In this case, however, oxidation reaction scarcely took place.

EXAMPLE 3

Experiments were conducted in the same manner as in Example 1 except for using manganese (II) acetate in place of cobalt acetate to obtain a product wherein manganese ion is bound to carboxyl group. The product contained $1.16 \times 10^{-4}$ mol/g of Mn(II) ion.

This product was added to ethanol, and bipyridyl was added thereto in an amount of 3 mols per mol of Mn(II) ion immobilized on the carrier. The mixture was then subjected to ultrasonic treatment, followed by collecting the reaction product by filtration, washing the product with water, and drying it. Thus, there was obtained a Mn-bipyridyl complex.

166mg of the thus-obtained metal complex (containing $1.93 \times 10^{-5}$ mol of Mn) was placed in a 50-ml flask, and 20 ml of water was added thereto. The flask was equipped with an oxygen-introducing pipe, and an oxygen gas was introduced into the flask through the pipe to replace the atmosphere in the flask with oxygen. 380 mg (150 times as much as Mn in mol number) of tetralin was added to the flask, and the mixture was shaked for 24 hours at 50° C. The reaction product was extracted with ethyl acetate. Gas chromatographic analysis of the product revealed that 57 % of tetralin was converted to tetralol or tetralone. Turnover number was 85.

EXAMPLE 4

25 33.1 g of silica fine particles was dispersed in toluene, and 1.12 g of N-[3-(trimethoxysilyl)-propyl]imidazole was added thereto. The resulting mixture was kept at 120° C. for 24 hours to react. 16.6 g of the reaction mixture was dispersed in a solution of 1.38 g of phthalocyanine-bipyridine complex in pyridine, and the mixture was refluxed for 3 hours in a stream of argon. The reaction product was collected by filtration, washed with successive, pyridine and acetone, and dried to obtain a reaction product (A) wherein a ferro-phthalocyaninepyridine complex was immobilized. Elemental analysis of the product revealed that $6.72 \times 10^{-5}$ mol of ferro-phthalocyanine was supported per g of the product. Then, silanol group remaining on the surface of the product was blocked with n-octadecyltriethoxysilane to obtain a ferro-phthalocyaninepyridine complex (B) immobilized on the carrier.

Thereafter, 102 mg of the product (containing $6.3 \times 10^{-6}$ mol of ferro-phthalocyanine) was dispersed in 20 ml of water, and 471 mg of tetralin was added thereto, followed by stirring the mixture for 17 hours at room temperature using a magnetic stirrer. As a result, 33 % of tetralin was consumed and converted to tetralone or tetralol, turnover number amounting to as many as 190.

COMPARATIVE EXAMPLE 2

Oxidation of tetralin was conducted in the same manner as in Example 3 using the ferro-phthalocyanine-pyridine complex immobilized product (A) obtained in Example 4. As a result, 30% of tetralin was consumed, with turnover number being 156. In this experiment, however, an ethyl acetate layer obtained by extracting the oxidation product with ethyl acetate appeared blue, which showed that phthalocyanine was eliminated from the carrier. Therefore, it is confirmed that the problem of elimination of the metal complex from the carrier can not be solved without protection by the octadecyl group.

EXAMPLE 5

In the same manner as in Example 4, there was obtained a ferro-phthalocyanine/pyridine complex immobilized product (B) of the present invention containing $7.7 \times 10^{-5}$ mol of ferro-phthalocyanine.

115 mg of this product (B) was dispersed in water and, after replacing the atmosphere by oxygen, 1.4 g (1370 times as much as ferro-phthalocyanine in the product in terms of molar number) of tetralin was added thereto. The mixture was shaked at a reaction temperature of 50° C. for 22 hours using a shaker. After completion of the reaction, the reaction mixture was extracted with ethyl acetate, and the extract was subjected to gas chromatographic analysis. As a result, it was found that it contained 73.6 mg of tetralol and 229.3 mg of tetralone, with turnover number being 270.

EXAMPLE 6

Experiments were conducted in the same manner as in Example 1 except for using PhO(CH$_2$)$_3$S(CH$_2$)$_3$—Si(CH$_3$)(OCH$_3$)$_2$ as the long molecular chain compound. As a result, it was confirmed that the thus-obtained cobalt complex was also effective as a catalyst for oxidation of tetralin.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A catalyst comprising an inorganic carrier, a metal complex immobilized on said carrier, and a long molecular chain compound bound to said carrier in an amount of at least 1.5 mols per mole of said metal complex, said long molecular chain having a length sufficient to surround said metal complex.

2. A catalyst as claimed in claim 1, wherein said inorganic carrier is a metal oxide or halide.

3. A catalyst as claimed in claim 2, wherein said inorganic carrier is silica, alumina, titania or a titanium halide.

4. A catalyst as claimed in claim 1, wherein said metal complex is bound to a short molecular chain residue which is bound to said inorganic carrier.

5. A catalyst as claimed in claim 4, wherein said molecular chain residue is derived from an organosilicon compound represented by the formula:

$$RSi(X)_n(Y)_m$$

wherein R represents a group providing a site to which said metal complex is bound, X represents a halogen atom or a lower alkoxy group which provides a site to which said inorganic carrier is bound, Y represents a lower alkyl group, n is an integer of 1-3 and m is an integer of 0-2 with the proviso that (m+n) is 3.

6. A catalyst as claimed in claim 1, wherein said long molecular chain compound is an organosilicon compound represented by the formula:

$$LSi(X)_n$$

wherein L represents an alkyl group having 10-30 carbon atoms, an alkenyl group having 10-30 carbons atoms, a polyether group having a total number of oxygen and carbon atoms of 10-30 or a polythioether group having a total number of sulfur and carbon atoms of 10-30, X is halogen or lower alkoxy and n is an integer of 1-3.

7. A catalyst as claimed in claim 1, wherein the metal of said metal complex is selected from the group consisting of Cr, Mn, Fe, Co, Ni, Cu, Mo, Ru, Rh, Pd, Ag, Au, W, Os, Pt, Zn, Ti, Mg and Al.

8. A catalyst comprising an inorganic carrier, a metal complex immobilized on said carrier, and a long molecular chain compound bound to said carrier in an amount of at least 1.5 mols per mole of said metal complex and surrounding said metal complex, said long molecular chain compound consisting of a molecular chain and a first reactive group which is bonded to said molecular chain and through which said long molecular chain compound is bound to said inorganic carrier, said long molecular chain consisting of 10-30 chain-constituting atoms selected from the group consisting of carbon atoms, oxygen atoms, sulfur atoms, nitrogen atoms and silicon atoms, and said first reactive group being selected from the group consisting of a halogen atom, a hydroxyl group, a carboxyl group, a sulfonic acid group, a dichloropyrimidine group, a dichlorotriazine group, a dichloroquinoxaline group, a group containing sulfato-ethylsulfonyl, a difluoromonochloropyrimidine group, a group containing acrylamide, a group containing trialkoxysilane or a group containing trihalogenosilane.

9. A catalyst as claimed in claim 8, wherein said inorganic carrier is a metal oxide or halide.

10. A catalyst as claimed in claim 9, wherein said inorganic carrier is silica, alumina, titania or a titanium halide.

11. A catalyst as claimed in claim 8, wherein said long molecular chain compound is an organosilicon compound represented by the formula:

$$LSi(X)_3$$

wherein L represents an alkyl group having 10-30 carbon atoms, an alkenyl group having 10-30 carbon atoms, a polyether group having a total number of oxygen and carbon atoms of 10-30 or a polythioether group having a total number of sulfur and carbon atoms of 10-30 and X represents a halogen atom or an alkoxy group.

12. A catalyst as claimed in claim 8, further comprising a short molecular chain compound bound to said inorganic carrier and consisting of (a) an intermediate chain, (b) a second reactive group which is bonded to said intermediate chain and through which said short molecular chain compound is bound to said inorganic carrier, and (c) a metal ion-capturing group which is bonded to said intermediate chain and through which said metal complex is bound to said short molecular chain compound, said intermediate chain consisting of 2-8 chain-constituting atoms selected from the group consisting of carbon atoms, oxygen atoms, sulfur atoms, nitrogen atoms and silicon atoms, said second reactive group being selected from the group consisting of a halogen atom, a hydroxyl group, a carboxyl group, a sulfonic acid group, a dichloropyrimidine group, a dichlorotriazine group, a dichloroquinoxaline group, a sulfatoethylsulfonyl group, a difluoromonochloropyrimidine group, an acrylamide group, a trialkoxysilane group and a trihalogenosilane group, and said metal ion-capturing group being selected from the group consisting of carboxyl, thiocarboxyl, amino, axo, cyano, hydrophosphorous acid, phosphorous acid, imine, alkylphosphine, arylphosphine and selenol.

13. A catalyst as claimed in claim 12, wherein said short molecular chain compound is an organosilicon compound represented by the formula:

$$RSi(X)_n(Y)_m$$

wherein R represents said metal ion capturing group, X represents said second reactive group and is a halogen atom or a lower alkoxy group, Y represents a lower alkyl group, n is an integer of 1-3 and m is an integer of 0-2 with the proviso that (m+n) is 3.

14. A catalyst as claimed in claim 13, wherein said short molecular chain compound is selected from the group consisting of $Cl_3Si(CH_2)_m$—COOH, $Cl_3S(CH_2)_mSH$, $(CH_3)(CH_3O)_2Si(CH_2)_mSH$, $(CH_3O)_3Si(CH_2)_mCOOH$, $(CH_3O)_3Si(CH_2)_mNH_2$, $(CH_3O)_3Si(CH_2)_mN(CH_3)_2$, $(CH_3O)_3Si(CH_2)_mNH(CH_2)_mNH_2$,

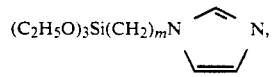

$Cl_3Si(CH_2)_mPPh_2$, $(CH_3O)_3Si(CH_2)_mPPh_2$,

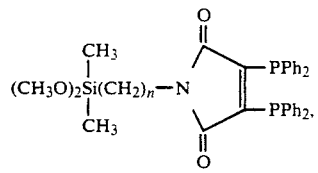

$(CH_3O)_3Si(CH_2)_mC_6H_4PPh_2$, $(CH_3O)_3Si(CH_2)_mP(C_2H_5)_2$, $(CH_3O)_3SiCp$, $(CH_3O)_3Si(CH_2)_mCp$, $(CH_3O)_3SiPPh_3$, $(CH_3O)_3Si(CH_2)_mN(CH_3)_3+.Cl^-$, $(CH_3O)_3Si(CH_2)_mNH_3+Cl^-$ and $(CH_3O)_3Si(CH_2)_mCN$, in which Cp represents cyclopentadienyl group, Ph represents a phenyl group, and m represents an integer of 1 to 8.

15. A catalyst as claimed in claim 6, wherein the metal of said metal complex is selected from the group consisting of Cr, Mn, Fe, Co, Ni, Cu, Mo, Ru, Rh, Pd, Ag, Au, W, Os, Pt, Zn, Ti, Mg and Al.

* * * * *

UNITED STATES PATENT AND TRADEMARK OFFICE
CERTIFICATE OF CORRECTION

PATENT NO. : 5,162,279
DATED : November 10, 1992
INVENTOR(S) : Keiji MIKI

It is certified that error appears in the above-identified patent and that said Letters Patent is hereby corrected as shown below:

Column 7, line 32, delete "25".

Column 10, line 15, delete "axo" insert --azo--.

Signed and Sealed this

Thirtieth Day of November, 1993

Attest:

BRUCE LEHMAN

Attesting Officer

Commissioner of Patents and Trademarks